April 22, 1924.
G. H. SETHMAN
1,491,108
ELECTRIC GENERATOR
Filed Feb. 2, 1918
3 Sheets-Sheet 1
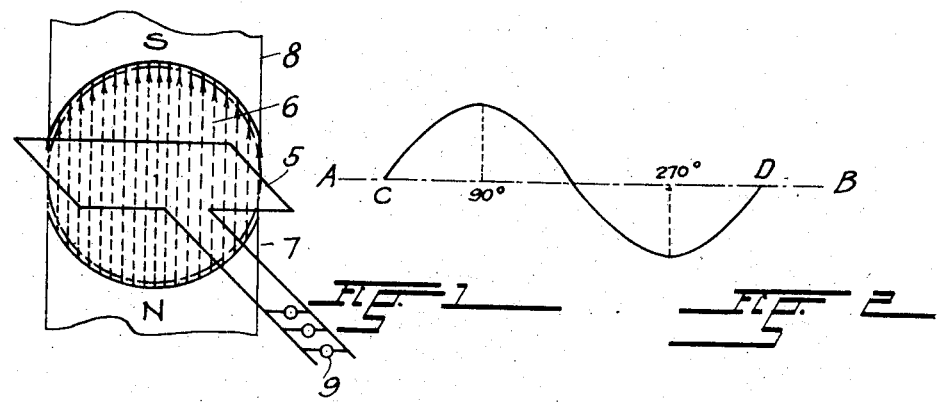
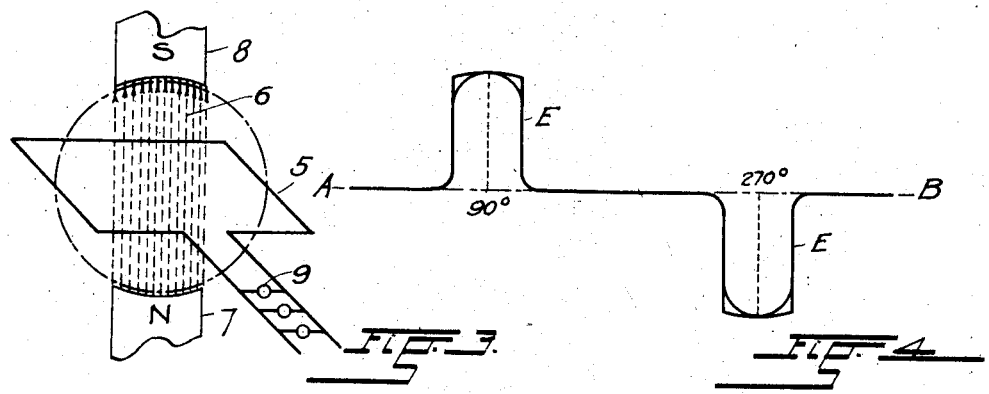
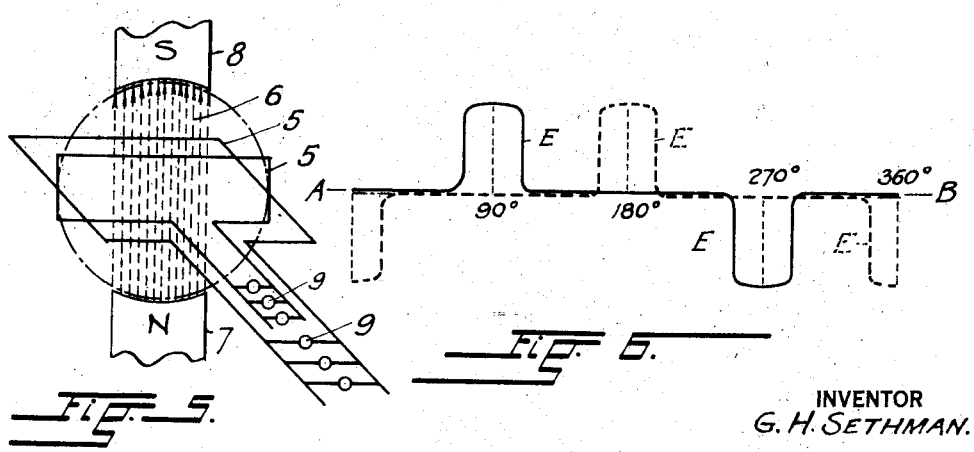
INVENTOR
G. H. SETHMAN.
BY
ATTORNEY

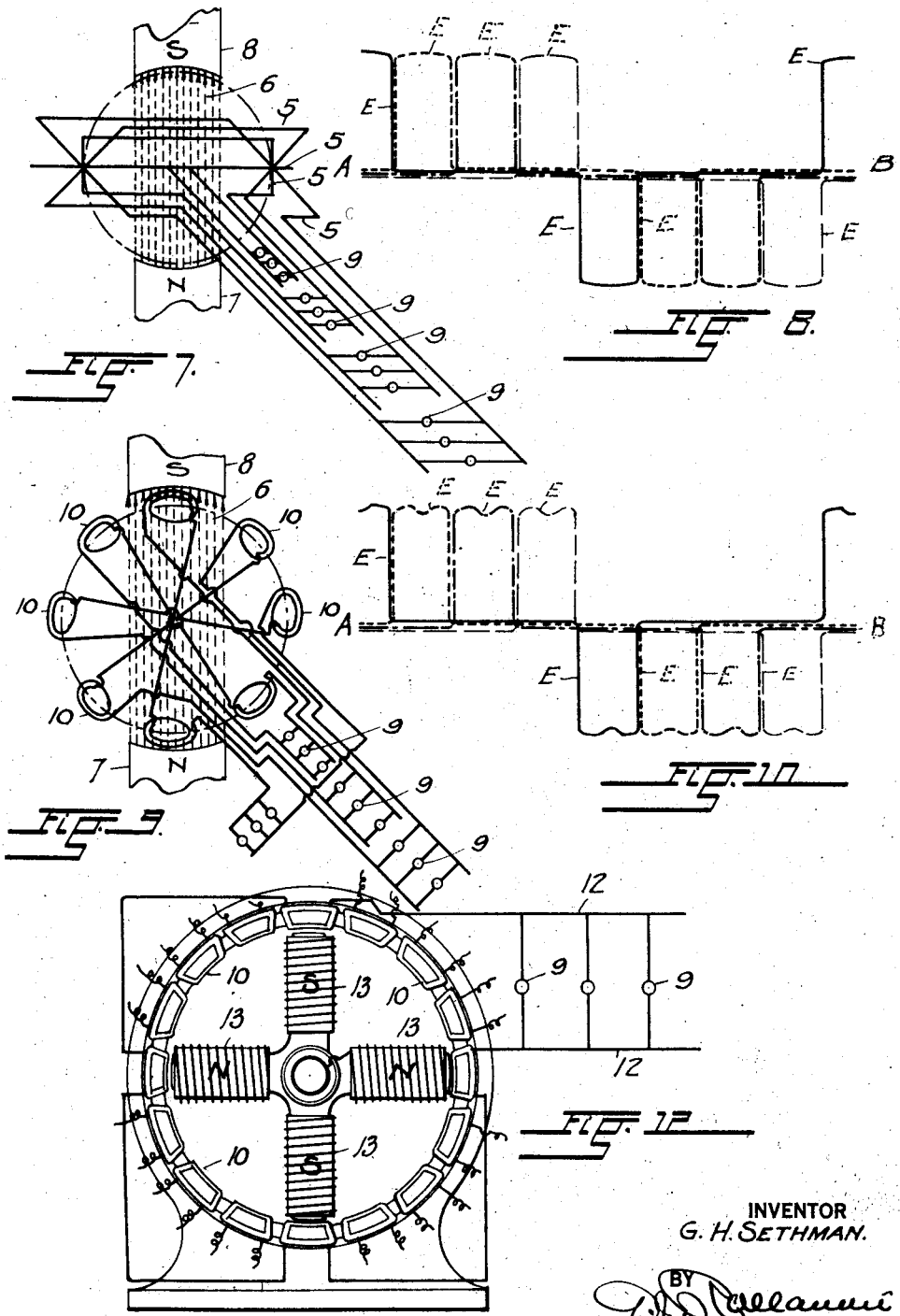

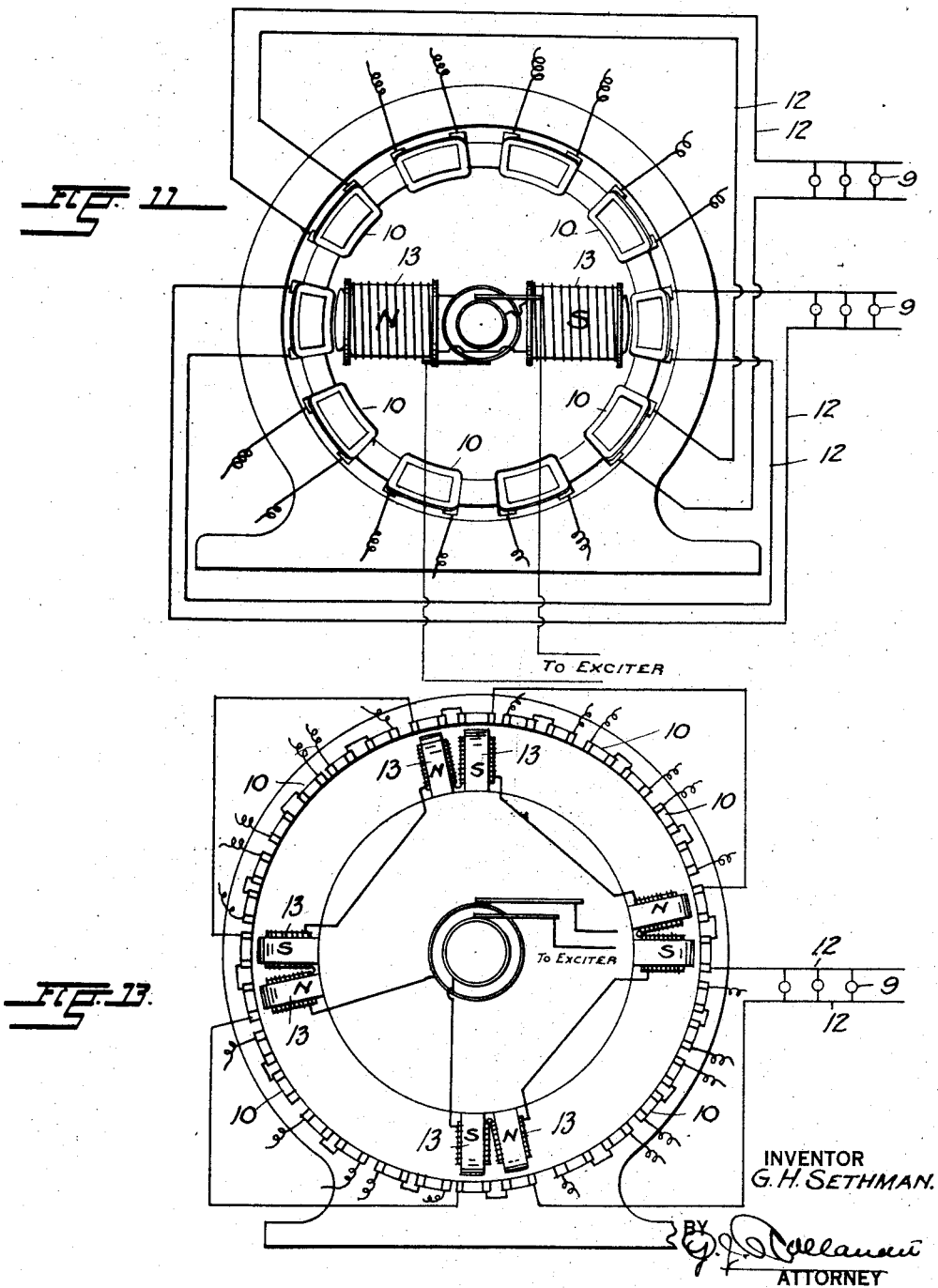

Patented Apr. 22, 1924.

1,491,108

UNITED STATES PATENT OFFICE.

GEORGE H. SETHMAN, OF DENVER, COLORADO, ASSIGNOR, BY DIRECT AND MESNE ASSIGNMENTS, OF TWO-FIFTHS TO CHARLES W. THURINGER AND THREE-FIFTHS TO WILLIAM FAIRCLOTH, BOTH OF DENVER, COLORADO.

ELECTRIC GENERATOR.

Application filed February 2, 1918. Serial No. 215,062.

*To all whom it may concern:*

Be it known that I, GEORGE H. SETHMAN, a citizen of the United States, residing at Denver, in the county of Denver and State of Colorado, have invented certain new and useful Improvements in Electric Generators, of which the following is a specification.

My invention relates to improvements in generators of electricity, and its primary object resides in providing a dynamo which produces a current flow of continuous efficiency by a periodically discontinued inductive action and which therefore in comparison with the ordinary continuously active generator, produces a current of like efficiency by an amount of mechanical energy which is reduced in proportion to the frequency and duration of the intermitting periods of inactivity.

The current produced by my improved method of electric current generation, as outlined hereinabove, is made up of a succession of intermittent and independent impulses which act alternately in opposite directions when the current is generated in an alternator of ordinary type, or in the same direction when the current is produced in an alternator of the inductor-type wherein only one of the poles is within reach of the so-called armature coil. The last-mentioned type of alternator, is, however, more or less obsolete and the following description of my invention will be restricted to the type of generators in which the armature-coils are influenced by both the north and south poles which determine the field of force.

For the effective use of a current of this description it is imperative that the periods of intermission between its impulses are not of sufficient length to produce a perceptible change in the active condition of the electric appliance excited by or consuming the current flow for heat, light or power.

When the current is used in the production of light, its intermittent periods of inactivity should be less than the cooling periods of the lamps through which it flows, it having been observed that there is a fixed period during which a lamp of determinate current retains its incandescence after a discontinuation in the passage of electric current and that if the current-flow is resumed before the expiration of this period there will be no perceptible difference in the illuminative effect of the lamp and the lighting remains as steady and uniform as it would be in the use of a constant commercial current.

While an intermittent current-flow of the above-described character is particularly adapted for use in systems of electric lighting, it is obviously of great value in the production of heat, and it may be effectively employed in the development of power by means of an electric motor or other similar appliance which by the inertia of its moving part or parts will continue its operation during the intervals between the alternating impulses of which the current-flow is composed.

To convey a clear understanding of the nature of my invention to those skilled in the art to which it appertains, I have shown in the accompanying drawings, a series of diagrammatic views representing different steps in the evolution of the principle on which my invention is based, from its elementary stage to its embodiment into a practical machine.

In the drawings,—

Figure 1 shows an elementary one-loop alternator diagrammatically,

Figure 2 is a graphic representation of the sine wave current generated by the generator disclosed in Figure 1, Figure 3 is a diagrammatic representation of an alternator for generating a current composed of intermittent impulses, Figure 4 is a graphic representation of the current generated by the generator disclosed in Figure 3, Figure 5 is a diagrammatic representation of an alternator similar to that shown in Figure 3 but having a plurality of independent loops, Figure 6 is a graphic representation of the currents generated by the alternator disclosed in Figure 5, Figures 7 and 8 are a diagrammatic representation of an alternator having a number of such independent loops and the corresponding graphic representation of the currents generated, Figures 9 and 10 are a diagrammatic representation of an alternator having a number of coils with a some-what different arrangement and the corresponding graphic representation of the currents generated, Figure 11 is a side elevation of an alternator constructed in accordance with the type diagrammatically represented in the previous figures having a rotating field instead of a rotating armature, Figure 12 is a side elevation of an alternator such as disclosed in Figure 11 having two pairs of field magnets and corresponding armature coils, and Figure 13 is a side elevation of such an alternator having the field magnets arranged in adjacent pairs.

In Figure 1 of the drawings is shown an elementary one-loop alternator of ordinary construction in which an alternating sine-wave current-flow is generated by the movement of an armature 5 constantly within a magnetic field of force indicated by the arrows 6 which represent the lines of force passing between the north and south poles, 7 and 8.

For clearness in illustration in this and the other diagrammatic views hereinafter to be explained, a number of lamps 9 have been shown in direct connection with the armature coils or loops, it being understood that as usual, the connection between the conductors of the generator and the current-receptive devices is made through the intermediary of rings and brushes.

The current generated under the conditions shown in Figure 1, is graphically represented by the sine-curve shown in Figure 2 in which the line A—B is the zero potential or abscissa, and the curve C—D represents the alternating current which reaches its maximum at the angles of 90° and 270° in the circle of rotation of the armature.

Inasmuch as the armature is constantly within the magnetic field, there is no interruption in the current-flow, and the wave motion of a generator of this type is therefore represented by a continuous curve extending alternately in opposite directions from the zero line, as is common in all commercial alternating current-generators of today.

To generate a current composed of intermittent independent impulses in accordance with my invention, I narrow the field of force as shown in Figure 3, so that the armature which again is represented as consisting of a single loop or coil, will move alternately within and without the field during determinate alternate periods in its rotary movement.

As a result of these periodic movements of the armature-coil without cutting any lines of force the current-wave instead of being of continuous sine-wave form as in the first-described illustration, assumes the form of impulse-curves which as indicated at E in Figure 4, project abruptly from the abscissa at the 90° and 270° angles in the circle of rotation and are separated by spaces which represent the periods during which the armature-coil moves out of the field of force and no generative action takes place.

The current produced by a generator of this type is in consequence made up of a succession of alternate, positive and negative impulses which are separate and independent and divided by periods of inaction whose length is determined by the width of the field in ratio to the circumference of the circle of rotation of the armature.

In this connection it should be understood that the production of an impulsing alternating current of this character is not confined to any particular form of impulse-wave, but merely to the relative positions of the waves alternately above and below the abscissa with a wide margin of time or space between them.

By carrying a plurality of independent loops or coils upon the same rotary element under the action of one magnetic field of contracted width as illustrated in Figure 5, impulse waves of the form as shown in Figure 6, are correspondingly multiplied, but the curve of each loop or coil is independent of that of any other and the operation of the generator produces as many separate current-flows as there are coils or loops in its rotating element.

Although the last-described generator produces an amount of current double of that generated by the single-loop construction shown in Figure 3, its operation does not require a correspondingly increased exertion of mechanical energy, apparently due to the inertia and balanced condition of the moving parts, and the current generation may thus be advantageously increased to any degree within the limits set by the proportions between the circle of rotation of the armature and the area of the field of force in one case, or between the circle of rotation of the field of force and its area compared to that of a stationary armature, in the other.

In the diagrammatic representation shown in Figures 7 and 8 as many loops or coils are included in the armature as can operate under the influence of one and the same contracted field without the production of overlapping impulse waves.

It will be seen that in Figure 8 the waves of the different currents adjoin one another so that there is no period of inactivity in the movement of the rotary element.

Under ordinary conditions it is preferable that no two coils should cut the lines of force simultaneously, or, in other words, that the spaces between adjoining coils should not be less than the width of the field of force. It may be advantageous, however, in a production of current for the operation of motors and other electrical appliances, that the impulse-waves slightly overlap so as to produce a less interrupted impellent force.

It will be understood that while the above conditions relate more particularly to the generation of current for single phase circuits, they are applicable by the proper distribution of the coils, for the production of alternating currents for polyphase circuits.

The diagrammatically represented form of generator shown in Figure 9 illustrates a more practical method of constructing a generator which produces a plurality of interdependent separate current flows each composed of a succession of intermittent alternating impulses such as that represented in Figure 4.

The coils 10 of the armature are in this construction wound separately in the circumference of the rotary element to move successively into the field of force between the poles, and each two opposite coils are wound reversely and joined in the same circuit.

The curve representing the current produced in the operation of a generator of this type as shown in Figure 10, is identical to that obtained in the operation of a generator having a similar number of coils of the type shown in Figure 7.

Figure 11 of the drawings represents a side elevation of a generator constructed in accordance with the type diagrammatically represented in Figure 9, except that the annular armature is stationary and the field magnets 13 rotate within the same as in the type of dynamos at present most commonly used.

During rotation of the field, a current is induced in each pair of opposite armature coils separate from the others and each pair of coils is connected in a separate and independent circuit which in the drawings is represented by the lines 12. In practical use, however, it is preferable to provide a field of multi-polar character with the north and south poles alternating within a stationary armature having a plurality of pairs of coils greatly exceeding the number of north and south poles which are disposed to register simultaneously with the magnets of the rotating element.

In Figure 12 of the drawings is shown a simple example of a generator of this type in which the rotating element carries two north and two south field magnets alternately disposed at quadrant points of its circumference.

The stationary armature has eight pairs of oppositely disposed coils and each two pairs which are disposed at quadrant points with relation to each other, are connected either in series or in parallel in one and the same circuit.

It will be understood that irrespective of the number of field magnets, any number of properly connected armature coils may be employed as can be placed in the circle of rotation of the rotary element of the generator, or that a larger number of field magnets may be used in combination with a correspondingly increased number of generating or armature coils.

In Figure 13 of the drawings I have shown an arrangement of poles in pairs around the circumference of the rotating element, which provides a compact and well-balanced form of multi-polar construction of my improved generator but which in principle does not differ from any of the simpler constructions hereinbefore described.

It will be seen from the above that an electric current composed of a succession of intermittent alternate impulses may be generated in a dynamo of the type herein described either by passing a fixed field of lines of force through stationary conductors or coils, or by permitting the conductors or coils to pass through and cut the lines of force in a stationary field, and that my invention is applicable to two-pole as well as to multi-polar construction.

In a dynamo of my improved construction as herein described, only those coils or conductors are connected in series or in parallel as come simultaneously under the influence of the poles in the field and each series of interconnected coils has periods of temporary inactivity at regular intervals during each revolution of the rotary element.

After a pair of coils or a series of interconnected pairs of coils has been induced to produce a current-flow for the generation of light, heat or power, it becomes inactive during a determinate period while another pair of coils, or another series of interconnected pairs of coils are induced to generate a current in their respective circuit or circuits and the flow of current in each circuit is intermittent and composed of impulses spaced by periods of inactivity during which the current surges without any perceptible change in the condition of the lamps, motor or other device or devices which are operated by its flow as hereinbefore explained.

It will be further understood that as in many of the present day generators, I may in my improved generator, make use of either uni-coils or of so-called distributed coils which are spread over a little more surface and are of advantage in that they produce a smoother sine-wave. It may also be advantageous in many instances, to place the armature coils so that their intervening spaces are of less width than the field-poles;

in fact the placement of the armature coils may be varied from that shown in the drawings in several ways to obtain the best results.

The manner in which the coils are applied to the armature-rings is obviously immaterial as far as the principle of my invention is concerned. A good distributing effect may be obtained by placing two or more small coils in adjacent slots and connecting them together so that the total effect will be the same as if only one coil were placed in a slot of greater dimensions, or it may be desirable to provide a large, deep slot for single coils, as shown in the drawings.

The relative arrangement of the field and armature elements may likewise be varied as is found to be most suitable for any desired purpose. For example, my invention may be applied to generators of the so-called "disk-type" in which an armature in which the coils are carried in suitable order upon a circularly laminated disk, revolves between two stationary fields, or rather, between two coactive parts of a stationary field, or in which the disk remains stationary and the fields revolve.

It is obvious that in generators constructed in accordance with my invention, any desired voltage may be produced by varying the winding and that a variety of current-wave forms may be obtained by spacing, distributing and placing different forms of coils and fields within reach of each other, through the medium of the magnetic field.

Having thus described my invention what I claim and desire to secure by Letters-Patent is:

A polyphase generator comprising induced windings, each phase winding of which comprises a number of coils arranged in pairs with the coils of each pair adjacent to each other and the pairs of coils of each phase arranged alternately with the pairs of coils of each of the other phases and in the same relative order, and a relatively rotary inducing member comprising inducing elements arranged in pairs with the elements of each pair adjacent to each other and the pairs of elements spaced in the same angular relation as each set of pairs of coils of each of the induced windings.

In testimony whereof I have affixed my signature in presence of two witnesses.

GEORGE H. SETHMAN.

Witnesses:
G. J. ROLLANDET,
L. RHOADES.